US006138065A

United States Patent [19]

Kramer

[11] Patent Number: 6,138,065

[45] Date of Patent: Oct. 24, 2000

[54] SYSTEM AND METHOD FOR MONITORING A PERFORMANCE CHARACTERISTIC USING TEMPERATURE AND LUBRICATION LEVEL OF VEHICLE COMPONENTS

[75] Inventor: Dennis A. Kramer, Troy, Mich.

[73] Assignee: Meritor Heavy Vehicle Systems, LLC, Troy, Mich.

[21] Appl. No.: 09/226,389

[22] Filed: Jan. 6, 1999

[51] Int. Cl.[7] ...................................................... G06F 17/00

[52] U.S. Cl. ............................ 701/29; 307/9.1; 73/117.3; 340/425.5; 701/33

[58] Field of Search .................................. 701/29, 33, 34, 701/35, 36; 307/9.1, 10.1; 340/425.5, 439, 449, 450.3; 73/117.3

[56] References Cited

U.S. PATENT DOCUMENTS 5,555,500 9/1996 Ogawa et al. ............................ 701/29
5,600,558 2/1997 Mearek et al. ............................ 701/29
5,646,341 7/1997 Schricker et al. ........................ 701/29
5,936,315 8/1999 Lais ........................................ 307/10.1

*Primary Examiner*—William A. Cuchlinski, Jr.
*Assistant Examiner*—Yonel Beaulieu
*Attorney, Agent, or Firm*—Carlson, Gaskey & Olds

[57] ABSTRACT

A method and system for providing enhanced diagnostic ability for monitoring vehicle performance characteristics includes utilizing a combination of temperature and lubrication level information. A first sensor monitors the temperature of a selected component, such as an axle, while a second sensor detects an amount of lubrication associated with that component. An electronic controller utilizes the temperature and lubrication level information to determine a performance characteristic and determines whether the selected component is operating within an acceptable range. The electronic controller preferably provides information to a vehicle operator through an on-board display indicating the monitored and determined characteristics on a real-time basis. Additionally, the electronic controller includes a memory module that stores performance characteristics information over time so that information can be provided to a service technician utilizing an external diagnostic computer.

20 Claims, 3 Drawing Sheets

SYSTEM AND METHOD FOR MONITORING A PERFORMANCE CHARACTERISTIC USING TEMPERATURE AND LUBRICATION LEVEL OF VEHICLE COMPONENTS

BACKGROUND OF THE INVENTION

This invention generally relates to diagnostic systems for motorized vehicles. More particularly, this invention relates to a method and system for determining performance characteristics based upon temperature and lubrication levels of at least one selected vehicle component to better ensure satisfactory vehicle operation.

There are a variety of commercially available diagnostic tools to assist technicians in servicing vehicles. For example, most modern day vehicles include an on-board computer that is capable of controlling or monitoring a variety of vehicle conditions. When a vehicle is brought to a service establishment, a technician can utilize a separate diagnostic computer to communicate with the on-board computer to gather various pieces of data or information regarding the vehicle.

A variety of sensors and mechanisms have been developed to assist in the diagnosis of vehicle performance problems or systems. Such sensors include speed sensors, for example, which assist in monitoring the rotational speed of a wheel axle and temperature sensors that provide indications of temperatures within vehicle fluids and lubrications. One shortcoming of current systems, however, is that the information from such sensors has not been fully exploited.

Additionally, even with advancements in technology, it has become increasingly difficult to accurately and adequately monitor vehicle performance characteristics at a level that is satisfactory for quick, effective and thorough diagnosis of a vehicle's performance. Those skilled in the art are always striving to make improvements on vehicle diagnostic systems. While a variety of such systems have been developed, many have limitations and drawbacks that do not permit them to be readily used on a variety of vehicles or a variety of components.

This invention provides a system and method for monitoring performance characteristics of selected vehicle components where temperature and lubrication levels indicate proper operating conditions for a selected component. This invention provides an improvement over prior systems and it provides a vehicle operator with real-time indications of the performance characteristics and provides a vehicle technician with a "history" to better enable the technician to perform required service on the vehicle.

SUMMARY OF THE INVENTION

In general terms, this invention is a system for monitoring a performance characteristic based upon the temperature of at least one selected component on a vehicle (such as an axle) and a lubrication value associated with that component. The system includes a first sensor that is supported on the vehicle and detects a temperature of the selected vehicle component. A second sensor is supported on the vehicle and detects an amount of lubrication associated with the selected component. An electronic controller communicates with the first and second sensors and determines whether a performance characteristic, based upon the detected temperature and the detected amount of lubrication, is within a selected range. The electronic controller provides a signal indicating when either the temperature or the amount of lubrication associated with the selected vehicle component causes the performance characteristic to be outside of a selected range.

In the preferred embodiment, the driver is provided with a visual display that provides the driver a visible indication of the detected temperature and lubrication levels and the determined performance characteristic. The display preferably provides a real-time indication of the detected and determined levels and provides warning signals to the vehicle operator whenever the temperature or lubrication levels move into a range indicating a need for immediate service of the vehicle.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
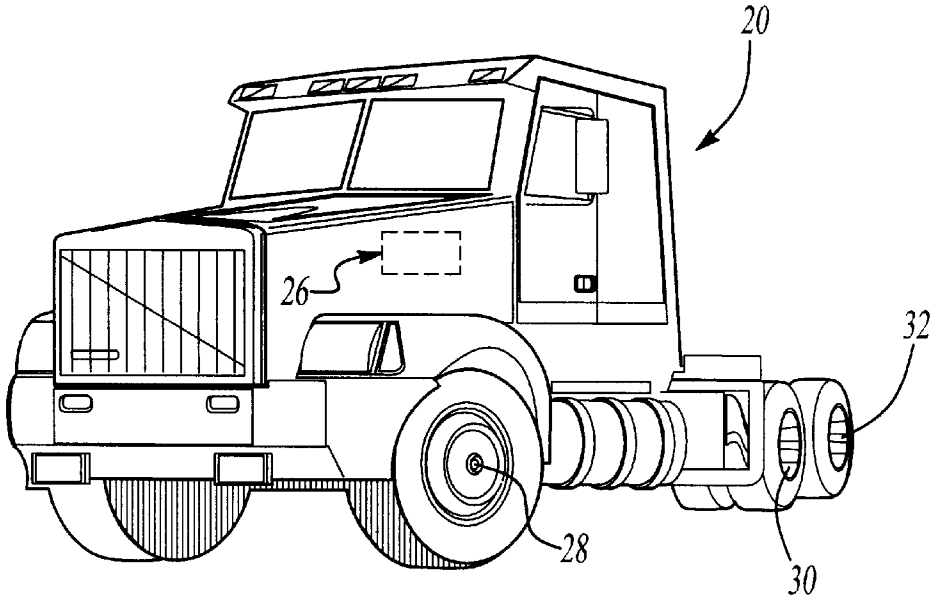
FIG. 1 is a diagrammatic illustration of a heavy duty vehicle incorporating a system designed according to this invention.

FIG. 1 diagrammatically illustrates a heavy duty vehicle 20 that has an on-board system 26 for monitoring performance characteristics of selected vehicle components. Examples of the selected vehicle components include wheel axles 28, 30 and 32 or vehicle transmission components (not illustrated). When the selected vehicle components include an axle or transmission components, it is desirable to monitor the temperature of the selected components and the lubrication level available for those components. The temperature and lubrication levels provide valuable information to determine a performance characteristic that indicates a current status of the selected components and can provide valuable information for servicing the vehicle.

Figure 2:
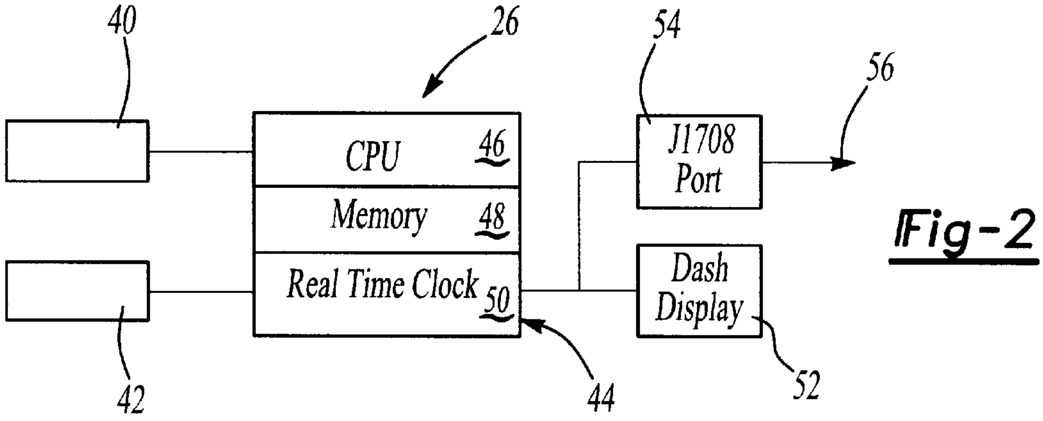
FIG. 2 is a schematic illustration of a system designed according to this invention.

FIG. 2 schematically illustrates the preferred embodiment of the system 26. A first sensor 40 is supported on the vehicle 20 so that it detects a temperature of the selected vehicle component. A variety of temperature gauges are commercially available and may be incorporated into a system designed according to this invention, depending on which is best-suited for a given situation.

A second sensor 42 detects an amount of lubrication associated with the selected vehicle component (i.e., an axle). A variety of fluid level sensors may be incorporated into a system designed according to this invention such as capacitive sensors or those that use reflected electrical signals to monitor fluid level on a real-time basis. Those skilled in the art will be able to choose from among commercially available sensors for the sensors 40 and 42, depending on the needs of a particular situation.

An electronic controller 44 preferably includes a central processing module 46, a memory module 48 and a clock 50.

The schematic "divisions" within the controller 44 are only for illustration and discussion purposes and do not represent physical component separations. The electronic controller 44 communicates with the sensors 40 and 42 and utilizes the information gathered by the sensors. The electronic controller 44 preferably determines a performance characteristic based upon the current temperature level and amount of lubrication associated with the selected vehicle component. The electronic controller 44 preferably is programmed to monitor the determined characteristic and measured temperature and lubrication amount data over time and to store the data in the memory module 48.

A driver display 52 preferably is provided in the cab portion of the vehicle 20 to provide a visible indication to the driver of the determined characteristic, the monitored temperature and the monitored lubrication level. The preferred embodiment includes an additional audible alarm to alert the driver to specific temperature and lubrication levels as will be described in more detail below. The system 26 preferably provides a real-time indication to a vehicle operator that shows the performance characteristic and the temperature and lubrication level of a selected component (such as a wheel axle). The preferred embodiment includes a reconfigurable display 52 so that the driver can observe a variety of characteristics for a variety of vehicle components as desired.

Additionally, the electronic controller 44 preferably communicates through a communication port 54 to provide information to a separate diagnostic device through a conventional communication link 56. Example communication ports include the SAE J1708/J1587 data bus and diagnostic connector as is known in the art. Of course, other data buses and other connection devices including cellular and satellite communication networks are within the scope of this invention. The communication port 54 allows a technician to access data from the memory portion 48 of the electronic controller 44 to gather information regarding the performance characteristics of the selected vehicle components over time. Therefore, the maintenance technician has an expanded knowledge of the vehicle condition resulting in quicker diagnostic procedures, more thorough diagnostic procedures, and a higher level of confidence for determining the reliability of the vehicle between inspections.

Figure 3:
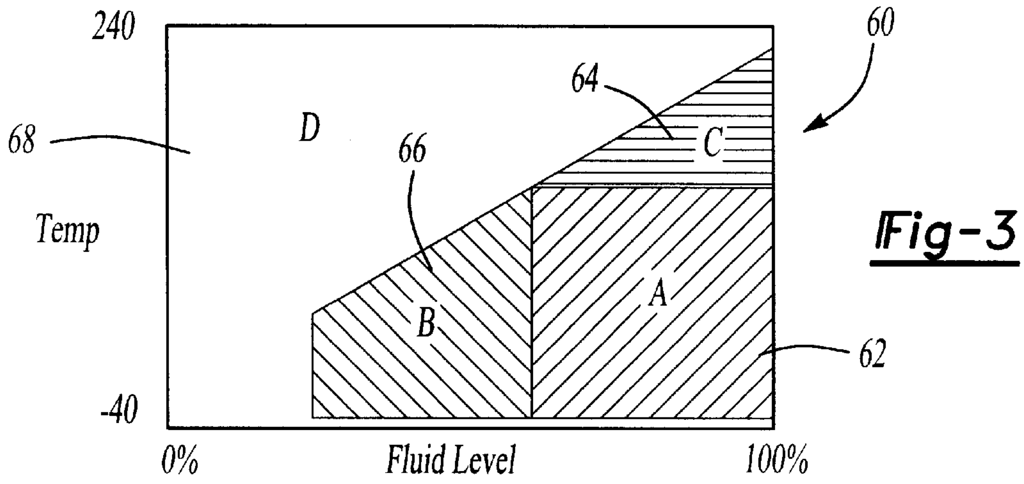
FIG. 3 is a graphical illustration demonstrating the performance of the system of FIG. 2.

FIG. 3 graphically illustrates a measurement scale 60 that shows the performance characteristic determined by the electronic controller 44 based upon the detected fluid level and temperature of the selected vehicle component. A first operating range 62 is considered a normal operating range. The specific thresholds or limits of the operating range 62 will vary depending upon the selected component and will vary from vehicle to vehicle. A second range 64 is an elevated temperature range where the detected temperature of the selected component exceeds the threshold from the normal operating range 62. In the second range 64, the fluid level is still within the expected limits for normal operation, but the performance characteristic is outside of the first range 62. A third operating range 66 includes expected temperature levels but includes lubrication levels that are below what should be expected under normal operating conditions. When the performance characteristic is within a fourth operating range 68, that indicates a condition where the vehicle requires immediate service as a potential failure condition exists because the combined fluid level and measured temperature of the selected vehicle components are outside of acceptable operating ranges.

The electronic controller 44 preferably is programmed to determine which of the operating ranges the selected vehicle components have at any given moment. Additionally, as mentioned above, the electronic controller preferably records information in the memory module 48 regarding the various operating ranges over time and makes that information available to a diagnostic computer used by a service technician.

Figure 4:
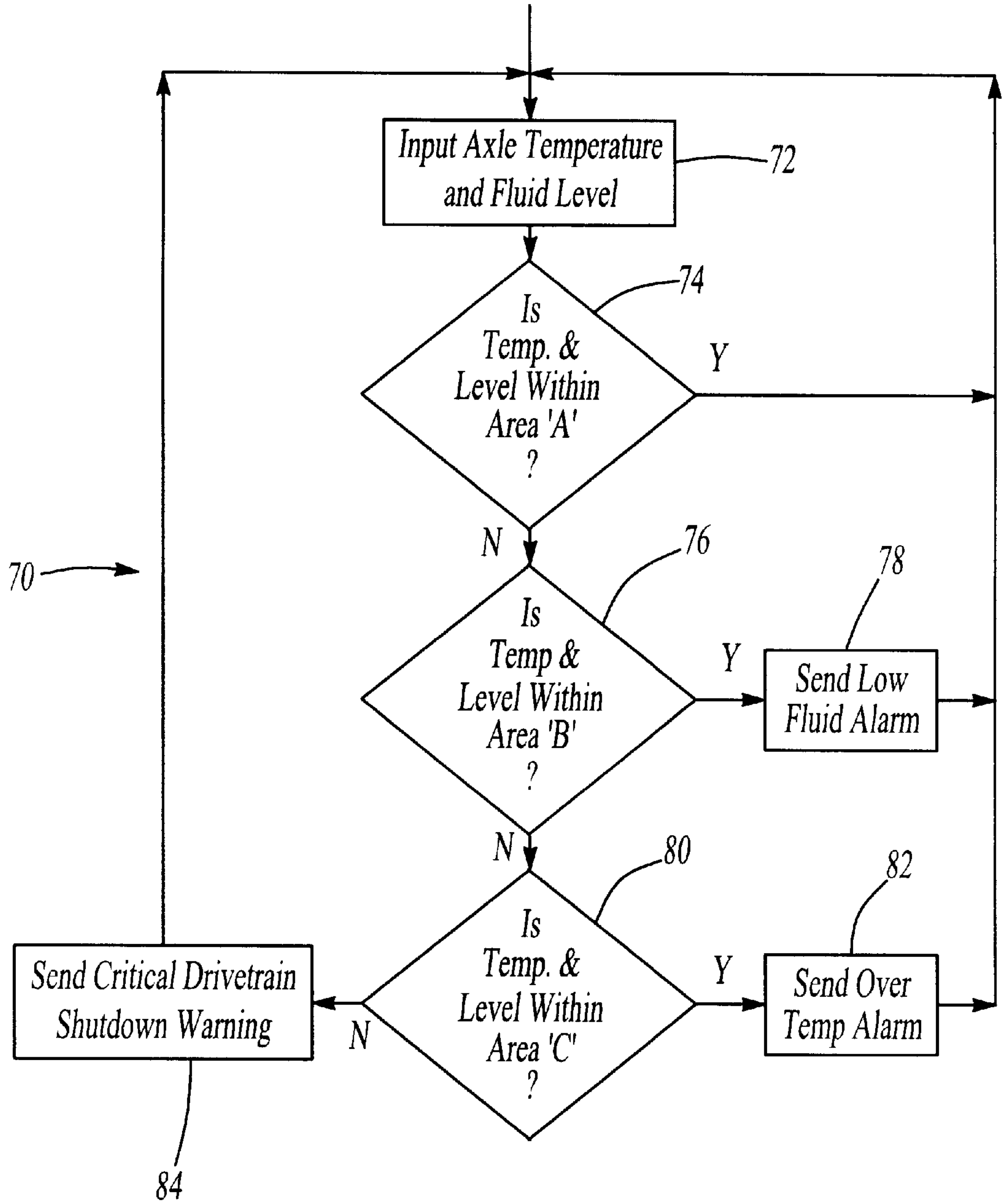
FIG. 4 is a flow chart diagram illustrating the preferred method of this invention.

FIG. 4 summarizes the preferred method of this invention. A flow chart 70 illustrates the various steps that are performed according to this invention. The sensors 40 and 42 provide input information at 72 regarding the temperature and fluid level of the selected vehicle component (i.e., an axle). The electronic controller 44 makes a first decision at 74 to determine whether the performance characteristic, which is based upon the detected temperature and fluid level, is within the first operating range 62. If the determined characteristic is within the normal operating range then the electronic controller 44 continues to monitor as before. If the determined characteristic is outside of the normal operating range 62 a decision is made at 76 to determine whether the combined levels fall within the third operating range 66. If the determined amount is within the third operating range 66, then a low fluid alarm 78 is provided to the vehicle operator.

If the combined measurement of temperature and lubrication level are not within the first operating range 62 or the third operating range 66 another decision is made at 80 to determine whether they are within the second operating range 64. If that is the case, then a high temperature alarm 82 is provided to the vehicle operator. In the event that the performance characteristic based upon the combined measurements of temperature and fluid level is not within any of the first, second or third operating ranges, then a critical warning signal 84 is provided to the vehicle operator indicating that the temperature and fluid levels are within the fourth range 68, which indicates a potential failure condition where the lubrication level is unacceptably low or the current operating temperature of the selected vehicle component is unacceptably high.

Providing the vehicle operator with a real-time indication of the determination made from the combined measurement of lubrication amount and temperature allows the vehicle operator to take necessary steps to avoid undesirable high repair costs, for example.

Figure 5:
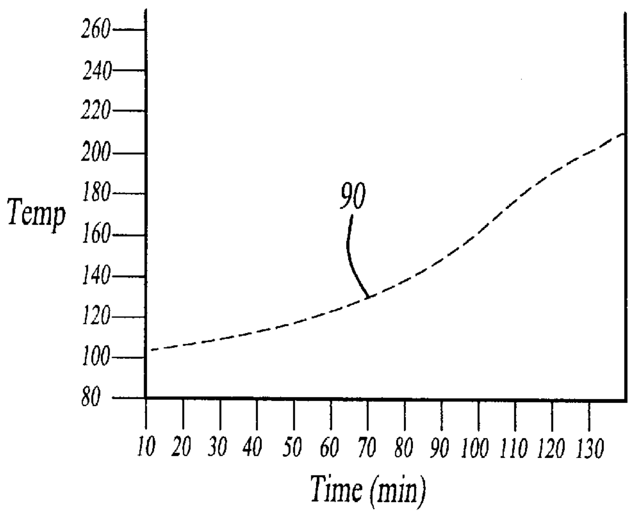
FIG. 5 is a graphical illustration of a determined vehicle characteristic over time.
Figure 6:
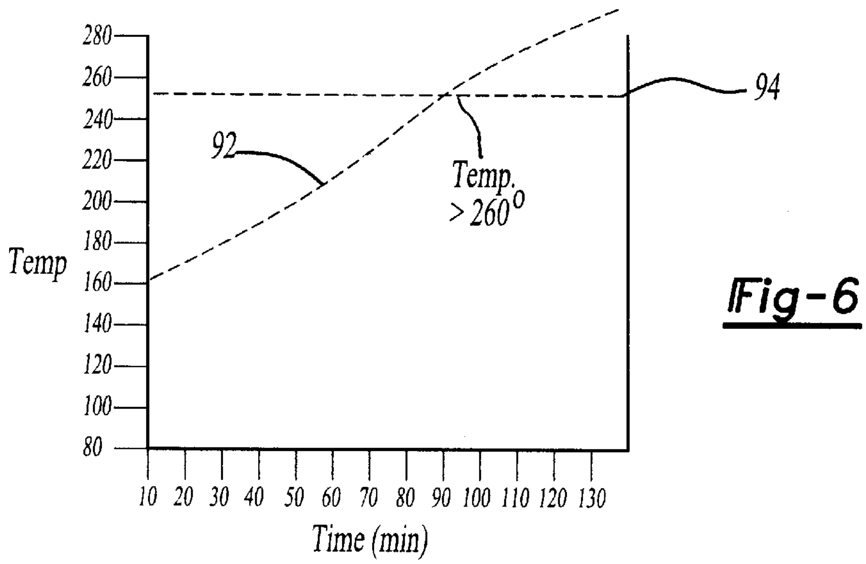
FIG. 6 is a graphical illustration similar to FIG. 5.

In the preferred embodiment, the electronic controller 44 preferably is also programmed to monitor changes in a characteristic of a selected vehicle component relative to time. As an example, FIG. 5 illustrates a plot 90 showing a change in the temperature of a vehicle component over time. The rate of change of temperature provides valuable information regarding the current operation status of the vehicle or the availability of lubricant, for example. FIG. 6 illustrates another plot 92 where the rate of change of the temperature is approximately the same as the rate illustrated at 90 in FIG. 5. The difference between FIG. 6 and FIG. 5, however, is that the temperature has exceeded a preselected maximum at 94. In the illustrated graph, the preselected maximum temperature is chosen as 260° F. For certain wheel axles, for example, an operating temperature above 260° F. is undesirable and, therefore, it is useful to provide the vehicle operator an indication of when this condition exists.

Figure 7:
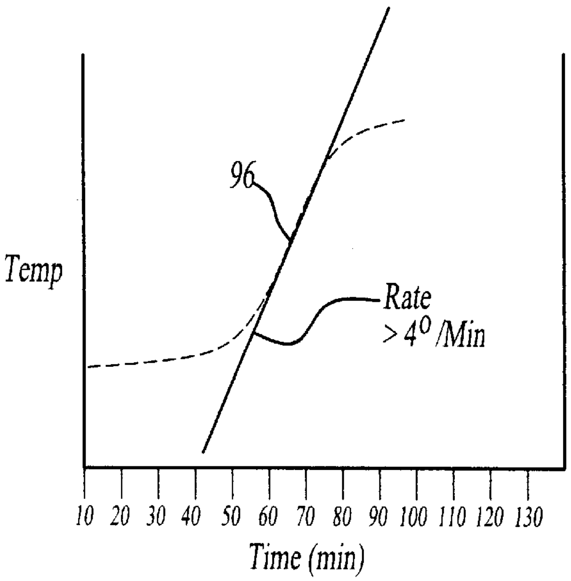
FIG. 7 is a graphical illustration similar to FIG. 5 illustrating a relatively rapid change in the determined vehicle characteristic over time.

FIG. 7 illustrates another plot 96 of a rate of change of temperature over time. In this illustration, the rate of change exceeds a desirable amount. The electronic controller 44 preferably monitors the rate of change of temperature over time and if that rate of change is outside of a preselected range, a signal is provided indicating that an undesirable condition exists. The display 52 preferably provides an indication to the driver that the temperature of the selected vehicle component is increasing, for example, at an undesirable rate. For example, the plot 96 indicates a rate change that is greater than 4° per minute, which may indicate that insufficient lubrication is being provided to the selected vehicle component.

The display provided to the operator on the display 52 preferably indicates that the rate of change of temperature is undesirably high and preferably provides possible suggestions to change the situation such as checking the lubrication line to ensure that the line has not been plugged or damaged.

As can be appreciated from this description, this invention provides an enhanced vehicle diagnostic tool to provide real-time feedback to a vehicle operator and to provide further information to a service technician regarding the performance characteristics of a vehicle and its components based upon a combination of more than one monitored variable. This invention utilizes the combined temperature and lubrication levels to ensure that a selected vehicle component is operating within an acceptable range. Given this description, those skilled in the art will be able to program an electronic controller in a manner that will accomplish the intended results of this invention.

The description just given provides an example implementation of this invention. Variations and modifications may become apparent to those skilled in the art that do not necessarily depart from the purview and spirit of this invention. The scope of legal protection given to this invention can only be determined by studying the following claims.

What is claimed is:

1. A system for monitoring the performance of at least one selected component of a vehicle using more than one monitored variable, comprising:

a first sensor supported on the vehicle that detects the temperature of the selected component;

a second sensor supported on the vehicle that detects an amount of lubrication associated with the selected component; and an electronic controller in communication with the first and second sensors, the electronic controller determining a performance characteristic based upon the detected temperature and the detected amount of lubrication and determining whether the performance characteristic is within a predetermined first normal operation range and provides a signal indicating when either the detected temperature or the detected amount of lubrication causes the performance characteristic to be outside of the first range and within a second range outside of the first range or a third range outside of the first range, respectively.

2. The system of claim 1, wherein the selected component comprises an axle and wherein the first and second sensors are positioned proximate the axle.

3. The system of claim 2, wherein the second sensor comprises a capacitance probe supported on an axle differential housing.

4. The system of claim 1, wherein the selected component comprises at least one transmission component and wherein the first and second sensors are supported on a transmission housing.

5. The system of claim 1, further comprising a display supported within the vehicle to be viewable by an operator of the vehicle and wherein the display provides an indication to the driver responsive to the signal from the electronic controller.

6. The system of claim 1, wherein the electronic controller includes a memory portion that records data regarding the performance characteristic, the detected temperature and the detected amount of lubrication relative to time and wherein the system further comprises a communication port that facilitates communication between the electronic controller and an external device that processes the data from the electronic controller memory portion.

7. The system of claim 1, wherein the electronic controller provides one of a plurality of signals indicating a status of the performance characteristic relative to the first range, the plurality of signals including a first signal indicating that the performance characteristic is within the first range, a second signal indicating that the detected temperature is causing the performance characteristic to be outside of the first range and within the second range, which corresponds to an undesirably elevated temperature, and a third signal indicating that the temperature is causing the performance characteristic to be outside of the first range and within the third range, which corresponds to an extreme temperature.

8. The system of claim 1, wherein the electronic controller provides one of a plurality of signals indicating a status of the performance characteristic relative to the first range, the plurality of signals including a first signal indicating that the performance characteristic is within the first range, a second signal indicating that the detected lubrication amount is causing the performance characteristic to be outside of the first range and within the second range, which corresponds to an undesirably decreased amount of lubrication, and a third signal indicating that the lubrication amount is causing the performance characteristic to be outside of the first range and within the third range, which corresponds to an extremely low amount of lubrication.

9. The system of claim 1, wherein the electronic controller also determines a rate of change in the detected temperature relative to time and provides a signal indicating when the rate of change deviates from a selected range.

10. A method of monitoring a condition of at least one selected vehicle component, comprising steps of:

(A) detecting a temperature level associated with the selected component;

(B) detecting an amount of lubrication associated with the selected component;

(C) determining a performance characteristic based upon the detected temperature level and the detected amount of lubrication;

(D) determining whether the performance characteristic is within a predetermined range; and (E) providing an indication that either the temperature level or the amount of lubrication is causing the performance characteristic to be outside of the predetermined range and within a second range or a third range, respectively.

11. The method of claim 10, further comprising determining a rate of change of the detected temperature relative to time and providing an indication when the rate of change is outside of a selected range.

12. The method of claim 10, wherein step (D) includes determining whether the detected temperature causes the performance characteristic to be within one of the first, second or third ranges, the first range being a normal operation range, the second range being an undesirably elevated temperature range, and the third range being an extreme range.

13. The method of claim 10 wherein step (D) includes determining whether the amount of lubrication causes the performance characteristic to be within one of the first, second or third ranges, the first range being a normal operation range, the second range being an undesirably decreased lubrication range, and the third range being an extreme range.

14. The method of claim 13, wherein step (E) includes providing a potential failure condition indication when the performance characteristic is within the extreme range.

15. The method of claim 13, wherein step (E) includes providing a warning condition indication when the detected temperature causes the performance characteristic to be within an elevated temperature range or the amount of lubrication causes the performance characteristic to be within the decreased lubrication range.

16. The method of claim 10, further comprising providing at least one of a visible or audible indication to a vehicle operator indicating a current detected temperature and a current detected amount of lubrication.

17. A method of monitoring a condition of at least one component on a vehicle, comprising the steps of:

(A) detecting a temperature level associated with the selected component;

(B) determining a rate of change in the temperature level relative to time;

(C) determining whether the rate of change exceeds a preselected maximum rate;

(D) determining whether the detected temperature exceeds a preselected maximum temperature; and (E) providing an indication that either the temperature level or the rate of change exceeds the respective preselected maximum.

18. The method of claim 17, wherein step (E) is performed by providing at least one of a visible or audible indication that the temperature has exceeded the preselected maximum temperature.

19. The method of claim 17, wherein step (B) includes determining a rate of increase in the detected temperature and wherein step (E) is performed by providing at least one of a visible or audible indication that the rate of increase exceeds the preselected maximum rate.

20. The method of claim 17, including determining whether at least one of the temperature level or the rate of change is within a first range, a second range or a third range, respectively.

* * * * *